Oct. 7, 1969   G. H. HESS   3,471,046
CART FOR GAS CYLINDERS
Filed Oct. 16, 1967   2 Sheets-Sheet 2
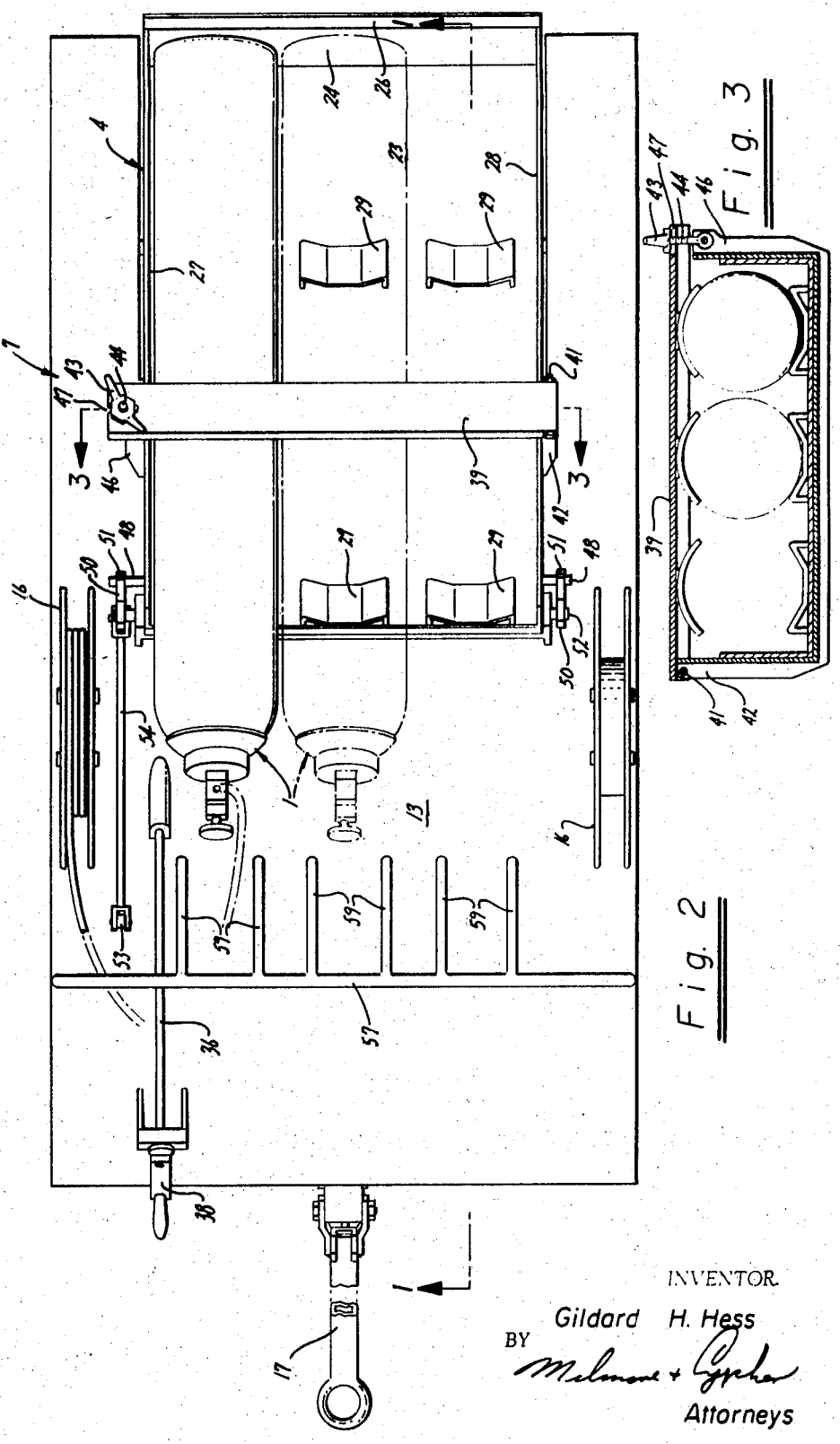
INVENTOR.
Gildard H. Hess
BY
Attorneys

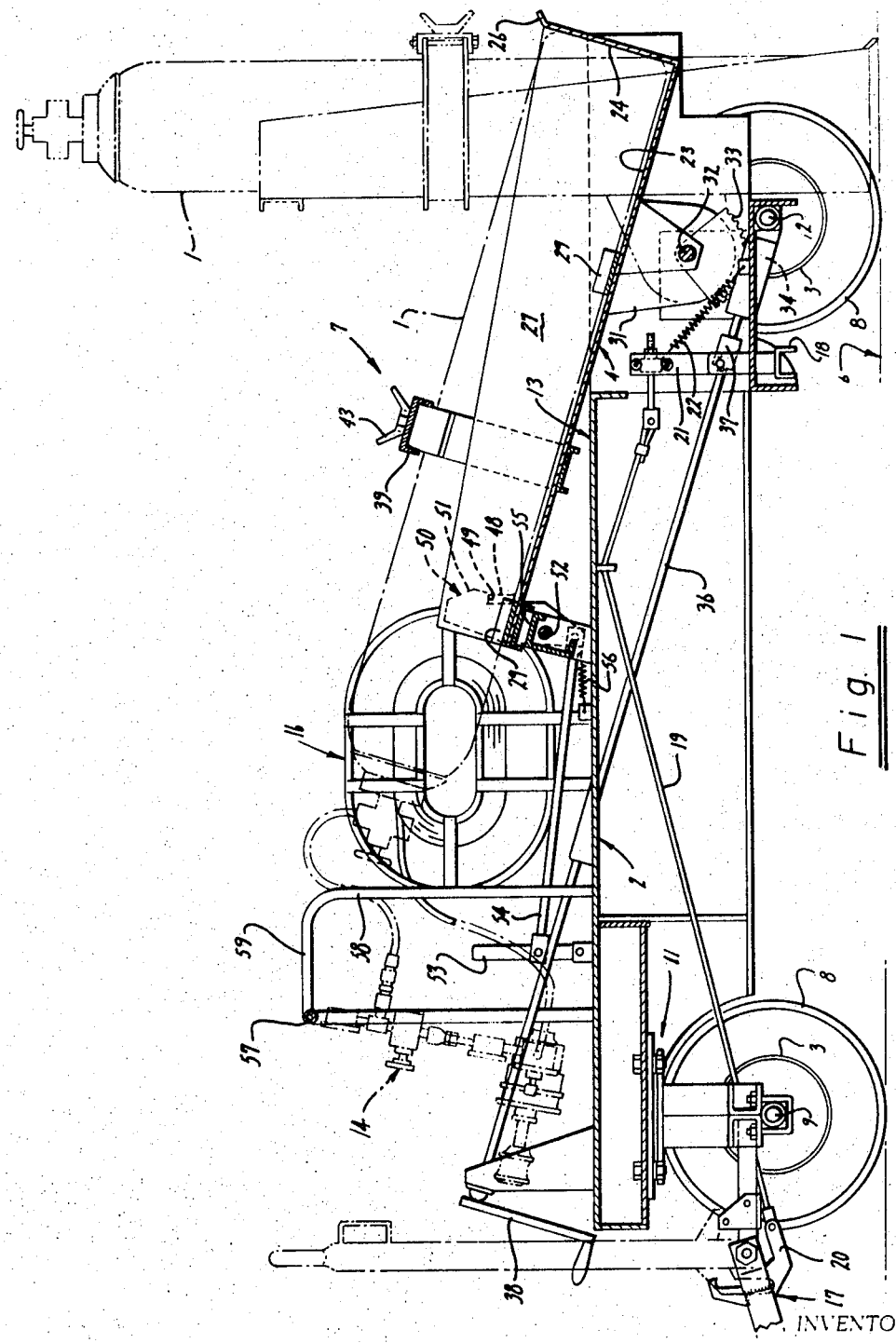

United States Patent Office 3,471,046
Patented Oct. 7, 1969

3,471,046
CART FOR GAS CYLINDERS
Gildard H. Hess, San Leandro, Calif., assignor to Stanray Corporation, a corporation of Delaware
Filed Oct. 16, 1967, Ser. No. 675,671
Int. Cl. B60p 1/04
U.S. Cl. 214—501                             1 Claim

ABSTRACT OF THE DISCLOSURE

This specification discloses a cart for transporting gas cylinders in an inclined position on a rack which elevates to a substantially vertical position with its lower end adjacent the pavement for unloading of the cylinders. The cart includes means for releasably holding the cylinders on the rack and means for positive controlled elevating of the rack.

---

This invention pertains to conveyances for gas cylinders, and in particular to a service cart useful wherever gas cylinders are used such as for aircraft servicing, chemical processing, manufacturing plants and engineering and construction work. Heretofore, carts and trucks either carried the cylinders in a vertical or horizontal position. Due to the weight of the cylinders and the customary means of moving them by rolling on the bottom end, the cylinders were generally transported and used in an upright position. Transportation at high speeds such as at airports in moving between the terminal and the aircraft involved risk of roll over because of the cart's high center of gravity. Further, use of such carts around aircraft resulted in accidental damage to both the cylinder valves and the undercarriage of the aircraft against the exposed valves of the vertical standing cylinders. Such carts carry bottles of oxygens for pressurizing the cabins and replacing emergency oxygen, and bottles of nitrogen for filling tires and servicing oleo struts.

The objects and advantages of the invention are as follows:

First, to provide a cart having a low profile which is transportable at relatively high speeds and which can elevate gas cylinders to a vertical position and lower the bottom end adjacent the ground surface for quick and easy unloading by one man.

Second, to provide a cart with a roll bar placed to protect the cylinder valves in the event of accidental upset or collision with low overhead obstructions such as airplane wings and elevators at airports.

Third, to provide a cart having safety devices for protecting the cylinder valves in the event the cylinders break loose from the cart rack in a sudden stop.

Fourth, to provide an elevating rack for a cart which can raise and hold cylinders in any position between the vertical and substantially the horizontal position.

Fifth, to provide a cart having an elevating rack and a safety catch for locking the rack in the inclined position.

BRIEF DESCRIPTION OF THE DRAWINGS

FIGURE 1 is a cross sectional view of the cart taken substantially along line 1—1 of FIGURE 2, showing a representation of a gas cylinder and the rack in phantom view; the tongue and hitch in a vertical position in phantom view and various valves in phantom view.

FIGURE 2 is a top plan view of the cart shown in FIGURE 1.

FIGURE 3 is a cross sectional view of the cylinder rack taken substantially along the line 3—3 of FIGURE 2.

DESCRIPTION OF THE PREFERRED EMBODIMENTS

The invention consists briefly of a cart for carrying a gas cylinder 1 having a frame 2 mounted on wheels 3, a rack 4 for the receipt of a gas cylinder pivotally mounted on the frame for movement between a first position in which the cylinder is held in a substantially vertical position with its base adjacent the ground surface 6, and a second position wherein the cylinder is elevated from the first position and the cart and cylinder present a low profile, means 7 releasably holding the cylinder on the rack, and means mounted on the frame for positive controlled elevating the rack between first and second positions.

The front pneumatic tires 8 and wheels are mounted on axle 9 which in turn is mounted on a fifth wheel assembly 11 attached to the frame or chassis. The rear pneumatic tires and wheels are rotatably mounted on axle 12 connected to the rear of the chassis. A bed 13 carries the manifold assembly 14 hose reel 16 and other apparatus described below. The cart may be pulled by a tractor or other vehicle (not shown) and a tow bar 17 and tongue assembly are mounted on the fifth wheel assembly. A brake 18 is applied to the rear pneumatic tire when the tow bar is dropped. This is accomplished by attaching cable 19 to a bracket 20 on the tow bar and to a pivotally mounted brake lever 21 attached to the brake. A brake spring 22 biases the brake to a disengaging position.

The cylinder rack may be constructed in various ways but here consists of a bed 23, and a base or platform 24 mounted at substantially right angles to the bed upon which the base of the bottle rests when the cylinders are in the vertical position. The platform is brought into close relation with the ground surface so that the gas cylinders (which are normally stored in a vertical position) can be rolled on the base edge of the cylinder onto the platform. An inclined lip 26 on the platform makes it easier to roll the cylinders on and off the platform. On the cart shown, sides 27 and 28 provide a safety barrier if the bottles jar loose from a pair of holders 29 provided for each cylinder.

The unique elevating characteristic of the rack is accomplished by a plurality of off-set members 31 connected to the rack bed and to an elevating shaft 32. Also connected to the elevating shaft is a gear segment 33 which is activated by any suitable means, but is here rotated by a worm gear 34 connected to crank shaft 36 by coupling 37 and turned by crank 38. The crank means provides a positive controlled elevating of the rack between a first position in which the cylinders are vertical and a second position in which the cylinders are nearly prone. The rack can be stopped and held in any position between first and second positions. As can be seen from the drawing, the second position places the cylinders in a low position, providing a low center of gravity for towing at relatively high speeds and a low profile for working under aircraft without damage to the aircraft and other places having low ceiling requirements without damage to the valves on the cylinders.

The means for releasably holding the cylinders on the rack here consists of a swing rack member 39 pivotally attached to pin 41 connected to bracket 42 mounted on the side of the rack. A hand engageable wing nut 43 is threadably attached to a threaded post 44 connected to bracket 46 mounted on the opposite side of the rack. A slot 47 in the swing rack engages the threaded post.

Placing the elevating shaft inboard of the rear axle of the cart gives better stability to the cart during the elevating of the cylinders and further moves the rack in the second position forwardly so that the bottom of the cylinders and the platform are brought inside the rear extensions of the chassis. Off-set members mounted on the elevating chassis thrust the rack outboard of the rear axle so that the platform can rest squarely on the ground surface.

A catch member 48 mounted on the rack releasably engages shoulder 49 formed on latch member 50 for holding the rack in the first position. The latch member is formed with a cam surface 51 which moves against the catch as the rack moves from first to second position for automatically engaging the catch to prevent strain on the worm gear. The latch also serves as a safety measure in preventing movement of the rack during movement of the cart. The latch member is pivotally mounted on shaft 52 and is connected to manually engageable lever 53 by member 54. The bed rests against stop member 55 and spring 56 moves the latch member to the latching position.

A primary feature of the cart is safety roll bar 57. Not only does the bar protect the cart in the event of roll over but it also protects the valves when the rack is in the second position. Lending support to the roll bar are a plurality of pairs of vertical members 58 extending between the frame and the roll bar. Each pair of vertical bars are disposed horizontally and adapted to receive, spread, and hold the head ends of the cylinders in the event the cylinders break loose from the rack and are thrown forwardly. The standard cylinders are tapered at the top and would "neck-in" and spread the vertical bars and become lodged therebetween. In order to bring a run-away cylinder to a stop before damaging the cylinder valve and the manifold assembly the vertical bars are disposed rearwardly from the roll bar by a horizontal portion 59.

In operation, the cylinders are loaded by first turning the handle 38 so as to rotate the cylinder rack to the first position wherein the platform is substantially parallel and in close proximity to the pavement or ground surface. Preferably the lip of the platform is in contact with the ground surface. In this position, the bed of the rack is in substantially vertical position. The swing rack member 39 is then pivoted to the cylinder receiving position and the cart is ready for loading. One man can then roll a cylinder on its bottom edge onto the platform and bring the cylinder in registration with a pair of holders 29. The swing rack is locked into place when all the cylinders are loaded by twisting the wing nut 43. The cylinders are then lowered to the second inclined or nearly prone position by turning crank 38. As the rack approaches the second position, the catch member on the rack contacts the cam surface on the latch member which pivots so that the rack may lower to a rest position against its stop member. The spring member moves the latch member automatically to the latching position.

The cart is now loaded for movement, and raising the tow bar to the towing position releases the tension on the brake cable and the brake spring pivots the brake lever thereby moving the brake out of engagement with the rear tire.

The loaded cart with the cylinders in the prone position has a relatively low center of gravity and can be towed at relatively high speeds without swaying or fish-tailing behind a tractor. Gas cylinders are under a pressure of about 3,600 pounds and as an added protection a roll over bar is provided which completely surrounds the valves of the cylinders.

The roll over bar is uniquely positioned so that pairs of vertical members support the roll over bar, and also provide a novel method of preventing cylinders from moving forwardly and off the rack in the event of a sudden stop or an accidental collision. Should one or more cylinders move forward, the tapered neck would move between the pairs of vertical bars and force the bars apart thus bringing the cylinders to a gentle stop. The deformed bars would then have a tendency to hold the cylinders firmly and with the top end restrained and the bottom end restrained by the sides of the rack, the cylinders would have little chance of leaving the cart even in the event of secondary transverse movements of the cart in the event of a collision. The vertical bars attached to the roll over bar present a secondary benefit by enabling the use of a smaller diameter roll over bar.

The gas in the cylinders would normally be used while the cylinders are in the substantially prone position, but merely releasing the latch member and turning the crank will move the cylinders to any position from the prone to the vertical. Empty bottles are easily removed from the cart by rotating the rack to the vertical position and bringing the platform substantially parallel to the ground.

I claim:
1. A cart for a gas cylinder comprising:
   (a) a frame mounted on wheels,
   (b) a rack adapted for the receipt of a gas cylinder pivotally mounted on said frame for movement between a first position in which said cylinder is loaded and held in a substantially vertical position with its base adjacent the ground surface, and a second transporting position wherein said cylinder is rotated longitudinally from said first position and said cart and cylinder present a low profile,
   (c) means releasably holding said cylinder on said rack,
   (d) means mounted on said frame for positive controlled rotation of said rack between first and second positions,
   (e) a roll bar mounted on said frame located adjacent the head of said rack having a height greater than the valve ends of said cylinders when said rack is in said second position, and
a plurality of pairs of vertical members extending between said frame and said roll bar, each pair disposed horizontally and adapted to receive, spread, and hold the head ends of said cylinders in the event said cylinders break loose from said rack and move forwardly and neck-in between said pairs of bars.

References Cited
UNITED STATES PATENTS

| | | | |
|---|---|---|---|
| 1,308,934 | 7/1919 | Chesnutt | 254—3.4 |
| 1,371,392 | 3/1921 | Penfield | 214—146.5 |
| 1,379,472 | 5/1921 | Morgan et al. | |
| 1,541,570 | 6/1925 | Howe | 254—3.6 |
| 1,827,209 | 10/1931 | Robbins | 254—3.6 |
| 2,052,697 | 9/1936 | Cochran | 254—3.6 |
| 2,570,256 | 10/1951 | Lyons | 254—3.2 |
| 2,624,483 | 1/1953 | Ketzel | 214—380 |

ALBERT J. MAKAY, Primary Examiner

U.S. Cl. X.R.

214—3